Patented June 14, 1927.

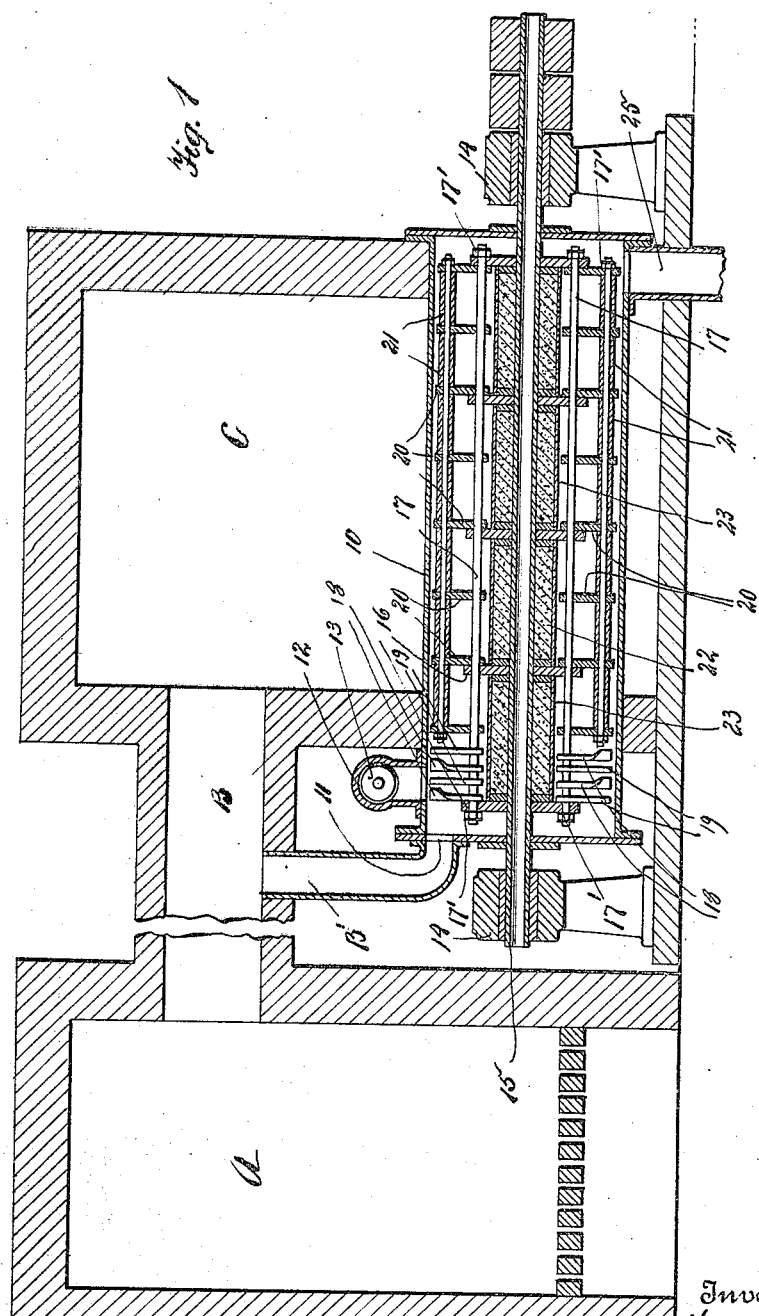

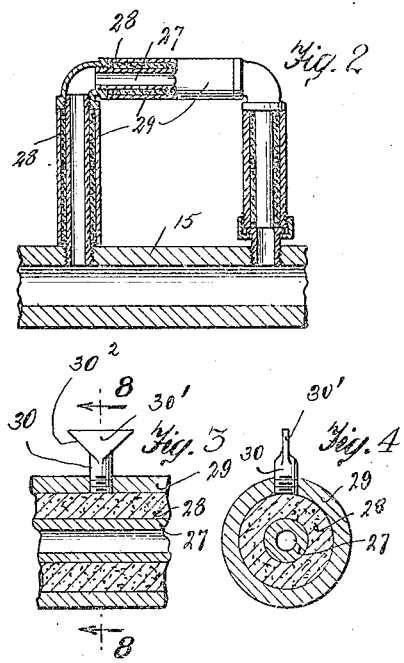

1,632,340

UNITED STATES PATENT OFFICE.

HERMAN B. KIPPER, OF MUSKEGON, MICHIGAN.

APPARATUS FOR SPEEDING REACTIONS.

Application filed August 1, 1921. Serial No. 489,030.

This application is a continuation in part of the application Serial No. 433,561, filed December 28, 1920, patented March 24, 1925, No. 1,530,749.

The present invention relates to an apparatus for carrying out such processes described in my co-pending applications Ser. No. 433,561, filed Dec. 28, 1920, and No. 479,799 filed June 23, 1921.

A considerable number of chemical reactions which hitherto have been, so to speak, merely chemically interesting, might be commercially utilized were it possible to make the speed of these reactions sufficiently rapid.

The object of my invention is to provide an apparatus which by mechanical means tends to so increase the speeds of these reactions that the latter afford commercial advantages. This invention is based on my discovery that the speeds of chemical reactions can be increased by thorough mixing and grinding the reaction substances simultaneously with the progress of reaction.

At this point and in this connection it is well to accentuate the great difference brought about in the speeds of chemical reactions involved by the step of merely mixing during the period of reaction as compared with the step of both grinding and mixing during the same period.

The step of mixing, of course, carries the material from the cold to the hotter zones of the furnace and, for many substances in their reactions with one another thereby, no doubt, increases the speed of reaction. It is, however, the step of grinding during the process of reaction that is the most effective and absolutely establishes the value of my process. Materials of the nature of those with which we are dealing tend to aggregate at higher temperatures and in the semi-fused state. Mixing tends only to increase such aggregation with consequent diminution in the speed of absorption of any gases which may be involved in the reactions in question. On the other hand, if the particles are prevented from aggregating by being separated and ground by hammer impacts the speed of reaction is not only very greatly increased but it is also brought far nearer to completion in a given capacity apparatus. Mixing alone does not increase the two above factors, and in fact, in reactions of nitrogen with solids, or semi-fused materials the reaction may be even greatly retarded by mixing. I have found that the aggregation mentioned in some cases still occurs when the hammers in the apparatus are driven at a speed of half a mile per minute; but that such aggregation is entirely eliminated at a speed of a mile per minute of the hammers.

My invention also has for its object to provide means for cooling the hammers and the shaft carrying them during the reaction within the cylinder.

Another object is to provide means for driving the reaction substances through the cylinder.

A still further object is to provide means for reducing the chilling effect on the reaction material by the hammers when cooled.

And still another object is to provide means for keeping the cylinder walls permanently free from caking or encrusting material.

With these and other objects in view my invention consists of a stationary or rotary metal pipe or cylinder through which extends a rotary shaft carrying a plurality of hammers, by the impact of which the mixing and grinding of the reaction substances are effected simultaneously with the progress of the reaction.

My invention also consists in the construction, combination and arrangement of parts as will be hereinafter more fully described and defined in the appended claims.

In the accompanying drawing which forms part of this specification, Fig. 1 is a longitudinal section of the apparatus; Fig. 2 is a sectional view of a hollow hammer communicating with the hollow shaft for the circulation of a cooling medium therethrough; Fig. 3 is a longitudinal section of the hollow shaft with a hammer made of a short round bar having its outer end flattened and Fig. 4 is a cross section thereof.

The reaction cylinder 10 is mounted in a chamber C which through a flue B communicates with the heating chamber A of a furnace. At one end the cylinder is formed with an inlet 11 which through a flue B' communicates with the main flue B and through which the hot combustion gases are conveyed into the cylinder 10.

The raw products are fed into the cylinder 10 through a passage or inlet 12 in which a helical conveyor 13 of well known construction may be provided.

Extending centrally through the cylinder 10 and rotatively supported in bearings 14 provided externally and at the ends of the cylinder is a hollow shaft 15 on which are fixed disk shaped members 16. These disks are provided with cross holes near their periphery through which pass longitudinally extending rods 17. The latter are threaded at their ends to receive nuts 17' whereby they may be fixed against lateral displacement. Mounted on the rods 17 near the inlets 11 and 12 are twisted hammers 18. The twisted hammers tend to draw the combustion gases from the heating chamber A into the cylinder, and the cutting hammers tend to draw the raw material through the inlet 12 into the cylinder. Also mounted on the rods 17 are arms 20 which carry hammers 21 for mixing and grinding the substances during the reaction. The shaft 15 preferably may be insulated by packings 22 of suitable insulation material enclosed in pipes 23 which are supported around the shaft 15 by means of disks 24.

At the other end of the cylinder I provide a discharge passage 25 through which the reaction material is forced out. A second passage (not shown) may be provided for the discharge of the waste gases. For cooling purposes water or air may be circulated through the hollow shaft during the reaction period.

The hammers for mixing and grinding may vary in construction and arrangement. In order to allow cooling thereof during the operation these hammers may be made hollow as in Fig. 3 by using pipes or hollow bars 27. These hollow hammers are made of several pieces or sections screwed to one another and to the shaft. The cooling medium flowing through the hollow shaft may thus be circuated also through the hammers.

In order that the hammers 27 when cooled may not chill too much the reaction material they may be covered with suitable packings 28 of asbestos cement or other suitable insulation material, which may be enclosed in pipe 29 mounted around the sections of said hammers, as shown in Fig. 3. These outer pipes 29 will attain a temperature approximating that of the reaction material but will be at the same time slightly cooled so that the metal will not lose its strength which it would at high reaction temperatures.

The feeding of the reaction material through the cylinder may also be aided by providing, what may be called, secondary hammers. These are short cylindrical rods 30 threaded at one end so as to be screwed into threaded bores of the outer pipes 29 of the hollow hammers 27. The outer ends of these rods are flattened as at 30' with the end edges $30^2$ thereof inclined at a suitable angle relative to the shaft. These inclined edges tend to force the reaction material through the cylinder at a given speed.

I have found the apparatus advantageous for the manufacture of nitrogen products from alkaline salts, nitrogen and carbon in the presence of iron. I have further employed it with good results for the manufacture of sulphuric acid according to the well known "lead chamber process" reactions; the manufacture of sodium silicate, of calcium phosphates, of oxalic acid, of zinc by reduction with carbon; for the absorption of sulphur dioxide gas by lime or calcium carbonate; of chlorine by milk of lime and hydrated lime; for the caustization of sodium carbonate by lime; and for the formation of sodium carbonate according to the well known "ammonia soda process." In manufacturing the sodium bicarbonate the solution temperature is controlled by water cooled hammers. Other chemical steps for which my apparatus should be especially adaptable are:—chlorination, bromination, sulphination, nitration, acetylization, oxidation, reduction, hydrogenation, alkalifusion, saponification, diazotization, sulphur fusion, etc.

The apparatus has also been used for fine grinding and drying of chemical materials. In experimenting with the oxidation of nitrogen to its oxides by passing air through the apparatus I have used the reaction cylinder as one electrode and the hammers as the other.

What I claim and desire to secure by Letters Patent is:—

1. In an apparatus of the character described, a rotary internally cooled shaft, internally cooled hammers carried by said shaft and means for insulating said shaft and hammers to reduce their chilling effect on the reaction material and to simultaneously reinforce the said shaft and hammers, said insulation means including packings and external pipes enclosing said packings.

2. In an apparatus of the character described, a reaction cylinder, a rotary internally cooled shaft therein, internally cooled hammers for mixing and grinding the reaction material and carried by said shaft, and means for insulating said hammers to reduce their chilling effect on said reaction material and to simultaneously reinforce said hammers, said insulating means including packings and external pipes enclosing the packings and means on said hammers for forcing said reaction material through said reaction cylinder during the reaction process.

3. In an apparatus of the character described, a reaction cylinder, a rotary internally cooled shaft therein, internally cooled hammers for mixing and grinding the reaction material and carried by said shaft, means for insulating said hammers to reduce their chilling effect on the reaction material and to simultaneously reinforce said hammers, and secondary hammers carried by said insulating means and adapted to force the reaction material through said cylinder during the reaction process.

4. In an apparatus of the character described a reaction cylinder, a rotary internally cooled shaft therein, internally cooled hammers for mixing and grinding the reaction material and carried by said shaft, means for insulating said hammers to reduce their chilling effect on the reaction material and to simultaneously reinforce said hammers, said insulating means including packings and external pipes enclosing said packings and secondary hammers carried by said external pipes and adapted to force said reaction material through said cylinder during the reaction process.

5. In an apparatus of the character described, a reaction cylinder, a rotary internally cooled shaft therein, internally cooled hammers for mixing and grinding the reaction material and carried by said shaft, means for insulating said hammers to reduce their chilling effect on the reaction material and to simultaneously reinforce said hammers and secondary hammers carried by said insulating means and having flattened parts, the end edges of which are inclined relative to said shaft and tend to force the reaction material through said cylinder during the reaction process.

Signed at New York, N. Y., this 28th day of July, 1921.

HERMAN B. KIPPER.